United States Patent [19]

Motley et al.

[11] 3,943,448
[45] Mar. 9, 1976

[54] APPARATUS AND METHOD FOR SYNCHRONIZING A DIGITAL MODEM USING A RANDOM MULTILEVEL DATA SIGNAL

[75] Inventors: David M. Motley, Santa Ana; King Y. Cheng, Tustin, both of Calif.

[73] Assignee: Hycom Incorporated, Irvine, Calif.

[22] Filed: Sept. 11, 1974

[21] Appl. No.: 504,860

[52] U.S. Cl................ 325/321; 178/68; 178/69.5 R
[51] Int. Cl.² ......................................... H03K 9/00
[58] Field of Search............ 179/15 BC; 178/69.5 R, 178/68, 69 R; 325/38 R, 38 A, 41, 42, 321, 323, 324; 333/18

[56] References Cited
UNITED STATES PATENTS

| | | | |
|---|---|---|---|
| 3,619,789 | 11/1971 | De Jager.......................... | 179/15 BC |
| 3,828,138 | 8/1974 | Fletcher........................... | 179/15 BC |

*Primary Examiner*—Benedict V. Safourek
*Attorney, Agent, or Firm*—Gordon L. Peterson

[57] ABSTRACT

An automatic digital modem receiving an input analog signal samples the input signal to provide a random multilevel data signal. This multilevel signal is equalized and phase corrected so that the characteristics of the modem are substantially synchronized with the characteristics of the input analog signal. A system error signal which is responsive to the random multilevel data signal is averaged to provide a synchronization quality signal. When the synchronization quality signal degrades to a predetermined magnitude, a restart signal adjusts the sampling, the equalization, and the phase correction of the modem to reduce the magnitude of the synchronization quality signal. The associated method includes the steps of adjusting only the phase correction of the modem for a particular interval of time and then jumping the sampling of the modem if the synchronization quality signal has not been reduced below the first predetermined magnitude.

12 Claims, 6 Drawing Figures

Fig. 3 (RECIEVER-35-)

Fig. 6

APPARATUS AND METHOD FOR SYNCHRONIZING A DIGITAL MODEM USING A RANDOM MULTILEVEL DATA SIGNAL

BACKGROUND OF THE INVENTION

1. Field of the Invention

This invention relates generally to digital data modems and more specifically to apparatus responsive to a random multilevel data signal for synchronizing the characteristics of such a modem with the characteristics of an input analog signal.

2. Description of the Prior Art

Multipoint communication networks typically include a master station having a transmitter and a receiver which communicates through a channel with a plurality of slave stations also having a transmitter and a receiver. In these networks, the channel is typically a telephone party line connecting the master station with all of the slave stations. The line between the master station and a specific slave station has individual characteristics which affect differently the signals transmitted to or from other slave stations.

The signal transmitted to usually an analog signal which is sampled to provide a random multilevel data signal in the receiver. The analog signal has timing, phase, and line characteristics which are preferably matched by the receiver in order to provide for the detection of the data in the incoming signal. If these characteristics of the receiver are not adequately synchronized with the characteristics of the input analog signal, the data detected by the receiver is inaccurate and therefore useless.

When a receiver falls out of synchronization with the incoming signal, it is desirable to restart or resynchronize the receiver. In some systems of the prior art, this has been accomplished by stopping the normal data transmission and substituting a predetermined, usually bilevel, data sequence. In response to this known data sequence, the receiver has determined the timing and phase error and adjusted the associated characteristics of the receiver to provide the desired synchronization.

Although these systems which provide for the transmission of a known data sequence can provide rapid synchronization, they may not be desirable in a particular multipoint communication network where it is not convenient to stop the flow of normal data. In a specific system, for example, a master station might communicate simultaneously with hundreds of slave stations to transmit data associated with a weather report. If the receiver at one of the slave stations were to fall out of synchronization with the incoming signal, it would clearly be undesirable to stop all data transmission merely to synchronize the one receiver. This would severely reduce the data throughput of the system since all of the receivers would have to wait for the one receiver to synchronize.

SUMMARY OF THE INVENTION

In the present invention a modem is provided with a control network which is responsive to a random multilevel data signal to synchronize the characteristics of the modem with the characteristics of the incoming signal. No special data sequence is transmitted by the transmitter so that the normal flow of data can continue. Thus the particular receiver which has fallen out of synchronization can bring itself back into synchronization without interrupting the transmission of normal data to the receivers at the other slave stations.

In the present invention, the system error signal is averaged over a particular interval of time to provide a synchronization quality signal. This quality signal is continuously monitored and when its magnitude reaches a particular level indicative of poor synchronization, a restart signal is generated. In response to the restart signal, the phase characteristics of the receiver are first adjusted for a particular interval of time. Then if the magnitude of the quality signal has not been reduced below the particular level, the timing of the sampler is jumped. This adjustment of the phase characteristics followed by a timing jump can continue for a particular interval of time until the magnitude of the quality signal is reduced below the particular level.

At this point normal adjustment of the characteristics of the modem can continue. If these normal adjustments do not further reduce the magnitude of the quality signal below a second particular level, the timing of the sampler can again be jumped. In a particular method, these steps will iterate for the particular interval of time. If the magnitude of the quality signal is not reduced below the second predetermined level within the particular interval of time, an alarm can be activated.

Of particular advantage to the present invention is the individual updating of the receiver parameters in sequence instead of simultaneously. Since the modem is decision-directed, incorrect decisions of the incoming data will detune rather than improve the characteristics of the receiver. If the sampling time is approximately correct, the phase lock loop will converge if it is adjusted alone. Then after the phase lock loop has converged, the probability of wrong decisions of incoming data is significantly reduced. Only then is the equalization and timing of the receiver updated so that eventually the receiver is returned to normal, synchronized operation.

DESCRIPTION OF PREFERRED EMBODIMENTS

Figure 1:
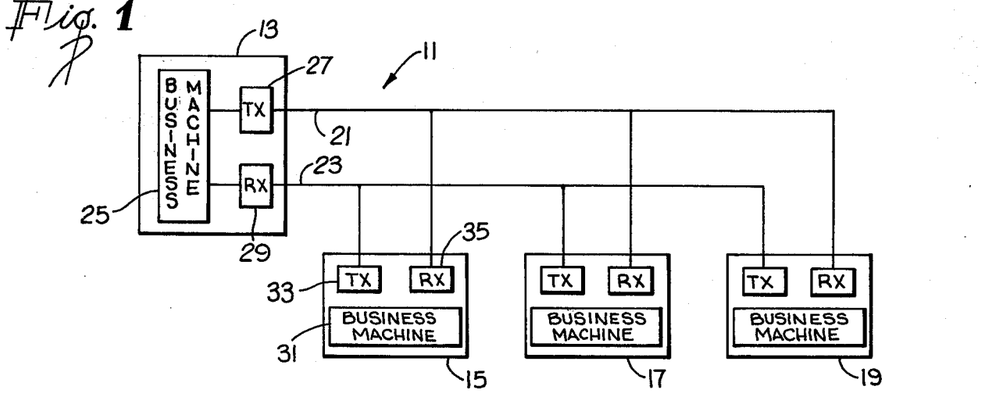
FIG. 1 is a block diagram of a multipoint communication network including a master station and a plurality of slave stations each including a transmitter and a receiver of the present invention.

A multipoint communication network is illustrated in FIG. 1 and designated generally by the reference numeral 11. The communication network 11 includes a master station 13 and a plurality of slave stations 15, 17, and 19 which transmit data over telephone lines 21 and 23. The master station 13 typically includes a business machine 25 and a modem characterized by a transmitter 27 and a receiver 29. The business machine 25 interfaces with the telephone line 21 through the transmitter 27 and interfaces with the telephone line 23 through the receiver 29.

In this type of communication network 11, each of the slave stations 15, 17, and 19 includes a business machine 31 and a modem characterized by a transmitter 33 and a receiver 35. At each of the slave stations 15, 17, and 19, the business machine interfaces with the telephone line 23 through the associated transmitter 33, and interfaces with the telephone line 21 through the associated receiver 35. Although only three slave stations 15, 17, and 19 are illustrated in FIG. 1, it will be understood that the communication network 11 can include a large number of slave stations.

The telephone lines 21 and 23 may be those designated by the Bell System as unconditional telephone channels. These channels are lease lines which include a pair of wires for each of the telephone lines 21 and 23. The modems at each of the master and slave stations 13, 15, 17, and 19 can be of the type disclosed and claimed in applicant's copending application Ser. No. 324,657 entitled AUTOMATIC DIGITAL MODEM filed on Jan. 18, 1973, and assigned of record to the assignee of record of the present application.

The procedure for transmitting data in such a communication network 11 begins when the master station 13 selectively polls each of the slave stations 15, 17, and 19 to determine if there is any data to be transmitted. If the business machine 31 in the slave stations 15, 17, and 19 has no data to send, it typically responds to the poll by transmitting a "not acknowledge" signal. In the American Standard Code for Information Interchange, such a signal is encoded NAK. Even though this message may be very short, the receiver 29 at the master station 13 must still adapt or synchronize to the characteristics of the incoming signal before it can accurately receive this signal or any data. These characteristics of the incoming signal vary with the chracteristics of the channel 23. Since the telephone channel 23 differs for each of the slave stations 15, 17, and 19, it follows that the characteristics of the signal incoming to the receiver 29 will also differ for each of the slave stations 15, 17, and 19.

The receivers 35 at the slave stations 15, 17, and 19 are "on line" at all times. In other words, the transmitter 27 at the master station 13 is connected at all times through the telephone line 21 to each of the receivers 35 at the slave stations 15, 17, and 19. When the receivers 35 are initially turned on, they typically undergo considerable adaptation in order to synchronize with the characteristics of the incoming signal. Since the telephone channel 21 will not differ for a given one of the receivers 35, these receivers will typically remain synchronized. Nonetheless, the characteristics of the signals in the telephone line 21 can vary and in some cases the characteristics of the receiver 35 will gradually fall out of synchronization with the incoming signal.

In some systems, when a receiver, such as the receiver 35, falls out of synchronization, the flow of normal data from the transmitter 27 to the receiver 35 has been inhibited in favor of a start-up data sequence. In another system, this start-up data sequence has consisted of alternating pairs of +3's and −3's. This bi-level data sequence has produced known characteristics in the receiver 35 so that the timing, equalization, and phase correction of the receiver 35 could be computed and corrected to provide synchronization. Unfortunately the interruption of the normal data transmission in the telephone channel has significantly reduced the data throughput of the systems of the prior art. Not only is the data interrupted to the particular receiver 35 which is out of synchronization, but is also interrupted to all of the other receivers 35 at the remaining slave stations 15, 17, and 19.

Figure 2:
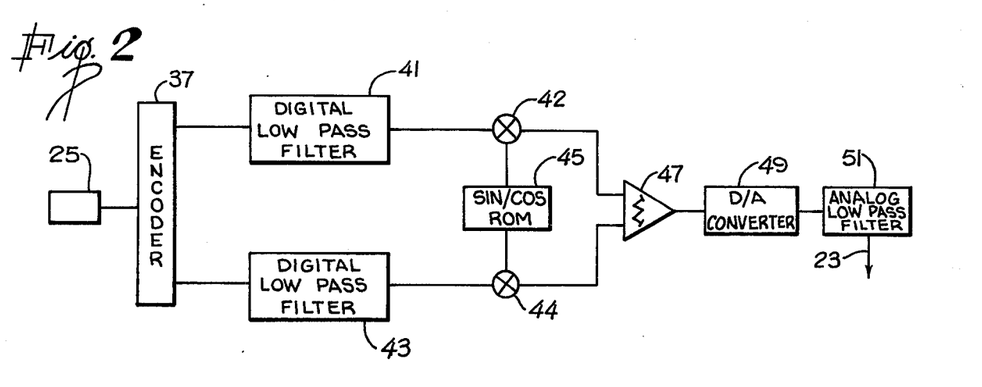
FIG. 2 is a block diagram of a typical embodiment of one of the transmitters illustrated in FIG. 1.

FIG. 2 illustrates in greater detail one of the transmitters, such as the transmitter 27, shown in FIG. 1. Following the associated business machine 25, the transmitter 27 includes an encoder 37 which is adapted to receive digitized data from the business machine 25 at a particular rate, such as 2400 bits per second or 4800 bps. Within the encoder 37, the incoming data is randomized, differentially encoded, and separated into an in-phase or I channel and a quadrature or Q channel.

At the output of the encoder 37, the signals in the I and Q channels include digital words or symbols $dI_j$ and $dQ_j$, respectively, where the sub $j$ implies the $j$th data symbol. Each of the data symbols $dI_j$ and $dQ_j$ expresses one of a plurality of data levels, the number of which depends on the speed of operation. For example if data is being transmitted at a rate of 2400 bps, the digital symbols will typically express data levels of $\pm 1$. For 4800 bps operation, the symbols will typically express one of four levels such as $\pm 3$ and $\pm 1$. The digital symbols will typically occur at the sample rate of 1200 per second so that the interval of time between adjacent symbols is 1/1200 seconds. This interval is commonly referred to as the baud interval and the sample rate is commonly referred to as the baud rate. At the baud rate of 1200 symbols per second, the throughput of the modem is 1200 symbols per second, times two bits per symbol, times two channels or 4800 bps.

Properly encoded, the input data symbols can be introduced to a pair of digital lowpass filters 41 and 43 in the I and Q channels respectively. These filters 41 and 43 in combination with similar filters in the receiver 35 can be tuned to provide this system with (1, ) partial response signaling. This characteristic, as well as many of the other features of the receiver 35, is explained in greater detail in copending application Ser. No. 324,657 entitled AUTOMATIC DIGITAL MODEM and assigned of record to the assignee of record of the present application.

After being appropriately filtered, the signals in the I and Q channels can be introduced to multipliers 42 and 44, respectively, wherein they are multiplied at a carrier frequency, such as 1600 Hertz, by digital quantities from a sine/cosine ROM 45. These modulated signals can then be combined in an adder 47, converted to analog format in a digital-to-analog converter 49, and smoothed by an analog lowpass filter 51. In its analog format, the signal is then sent to the telephone line 23.

The characteristics of the signal transmitted on the telephone line 21 may be altered to a greater or lesser extent depending on the quality of the line 21. For example, the line 21 may cause the entire data spectrum to shift; this is typically referred to as frequency offset. If the telephone line 21 is of poor quality, it will typically produce phase jitter so that the carrier phase of the received signal varies in a sinusoidal manner with respect to the carrier phase of the transmitted signal. There may also be an initial difference between the carrier phase of the transmitter 27 and the carrier phase of the receiver 35. This is commonly referred to as phase offset.

The telephone line 21 will also typically produce asymmetrical as well as symmetrical delay and attenuation distortion. This distortion is based on the treatment the telephone line 21 gives each particular frequency in the spectrum with respect to the carrier frequency For example, some of the frequencies of the spectrum will experience a greater delay than other frequencies in the spectrum. Similarly, the telephone line 21 may attenuate some frequencies more than others. It is, of course, desirable that the receiver 35 be able to compensate for all of these undesirable characteristics of the telephone line 21 in order to minimize the differences between the characteristics of the signal received and the characteristics of the signal transmitted.

Figure 3:
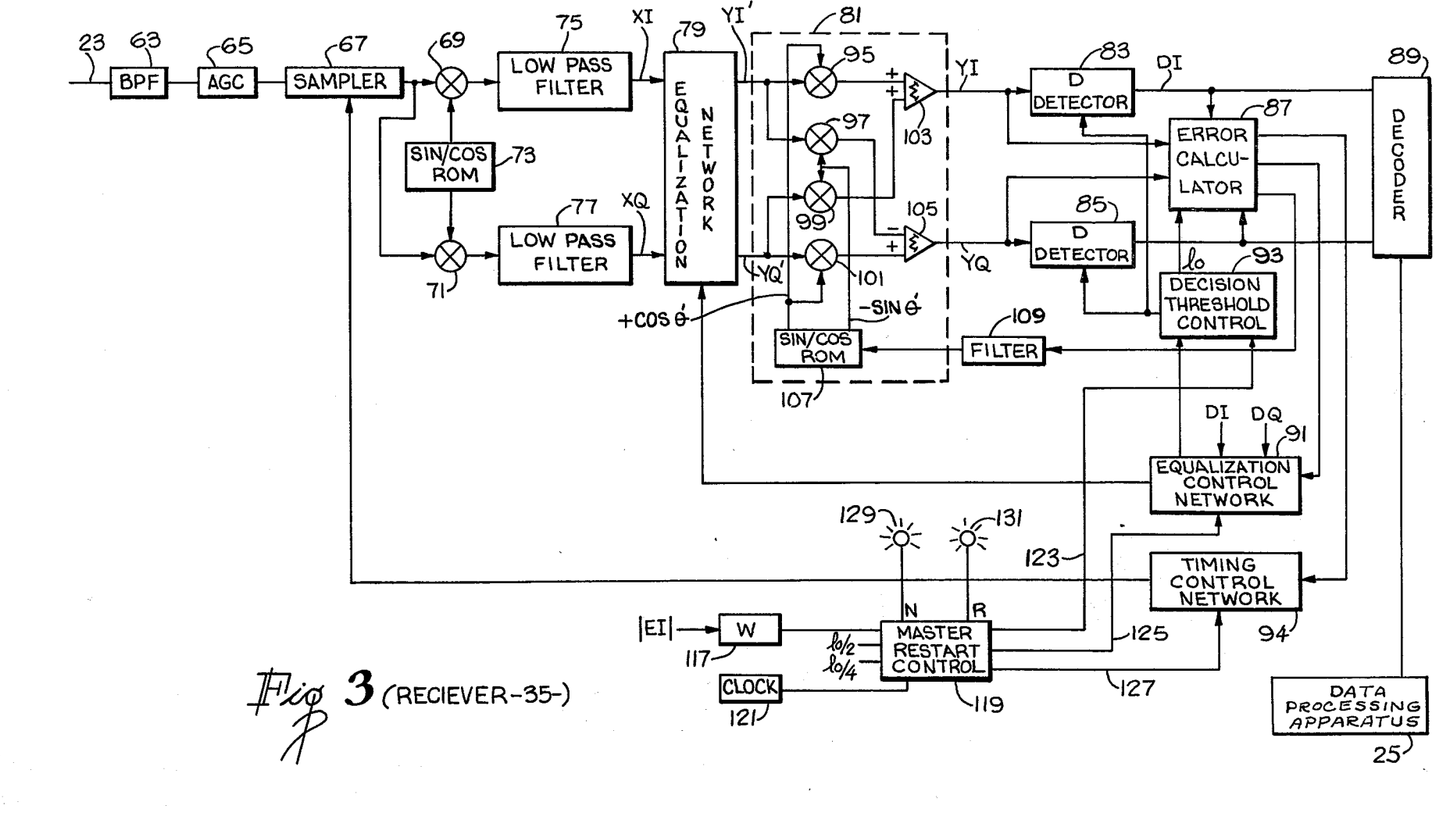
FIG. 3 is a block diagram of a preferred embodiment of one of the receivers illustrated in FIG. 1 and which includes a synchronization quality signal generator and a master restart control of the present invention.

The receiver 35 is illustrated in greater detail in FIG. 3. This receiver 35 has properties for adapting to the characteristics of a channel, such as the telephone line 21, in response to random multilevel data. Thus the particular receiver 35 which has fallen out of synchronization with the incoming signal can resynchronize using the multilevel data of the incoming signal. The normal data sequence transmitted from the transmitter 27 need not be interrupted in favor of a special data sequence so that the remaining receivers 35 in the network 11 can continue to receive meaningful data. Although the receiver 29 can also be of the type illustrated in FIG. 3, the multilevel synchronization characteristics of the present invention are particularly desirable for the receivers 35 which will be out of synchronization less frequently than the receiver 29 in the master station 13.

The receiver 35 can be of the general type disclosed and claimed in the copending application Ser. No. 324,657 previously mentioned. Thus the receiver 35 will typically receive the input analog signal from the telephone line 21 and will pass this signal through an analog bandpass filter 63 and an automatic gain control 65. The bandpass filter 63 selects the desired passband and the automatic gain control 65 provides the desired signal level. An analog-to-digital converter or sampler 67 is provided to sample the incoming analog signal at a rate, such as 4800 times per second, corresponding to some multiple of the symbol or baud rate of the transmitter 27.

It will be noted that in this embodiment the signals throughout the remainder of the receiver 29 have a digital format.

The digital signal from the sampler 67 can be separately multiplied in each of a pair of multipliers 69 and 71 by a sine/cosine ROM 73. In this manner, the signal can be noncoherently demodulated and separated into an I channel and a Q channel in the receiver 35.

From the multipliers 69 and 71, the signals can be introduced to a pair of digital lowpass filters 75 and 77 in the respective I and Q channels to select the desired baseband for the demodulated signals. It is the filters 75 and 77 in the receiver 29 which are tuned with the filters 41 and 43 in the transmitter 33 to provide the (1, 1) partial response signaling.

Following the filters 75 and 77, the two baseband signals in the I and Q channels which are commonly designated XI and XQ, respectively, can be introduced to an equalization network 79. This network 79 corrects for the asymmetrical as well as the symmetrical delay and attenuation distortion caused by the telephone line 21. The network 79 includes a pair of trans- versal equalizers for each of the I and Q channels. Each of these equalizers includes a plurality of taps sequentially multiplying the digital words in the XI and XQ signals by a variable multiplying coefficient. The resulting products are combined to provide the YI' and YQ' signals.

The equalized signals, which are commonly designated YI' and YQ', can then be introduced to a phase correction network 81 which compensates for the frequency offset, phase offset, and phase jitter of the incoming signal. At the output of the phase correction network 81, the equalized and phase corrected signals in the I and Q channels are usually designated YI and YQ respectively.

Following phase correction, the signals in the I and Q channels can be separately detected in a pair of slicers or detectors 83 and 85, respectively, and introduced to an error calculator 87 along with the signals from the phase correction network 81. At the output of the detectors 83 and 85, the detected signals are commonly designated DI and DQ. These signals DI and DQ can be expressed in terms of the data $dI_j$ and $dQ_j$ as follows:

$$DI_j = dI_j + dI_{j-1}$$

$$DQ_j = dQ_j + dQ_{j-1}$$

It follows that if the data symbols $dI_j$ and $dQ_j$ have one of four levels, such as $\pm 1$ and $\pm 3$, the detected symbols $DI_j$ and $DQ_j$ will have one of seven levels, such as zero, $\pm 2, \pm 4$, and $\pm 6$. This type of operation is commonly referred to as 4/7 Operation.

Each of the signals XI and XQ, YI' and YQ', YI and YQ, and DI and DQ have a digital format. Each of these signals consists of a plurality of digital words or symbols each having digital characteristics which express one of a plurality of levels. During the transmission of normal data, these levels will appear at random depending on the data transmitted. As used herein, these signals will be referred to collectively as random multilevel data signals.

In the preferred embodiment, the error calculator 87 provides a system error signal for updating the sampling time of the sampler 67, the equalization of the network 79, and the phase correction of the network 81. It is of particular advantage to the receiver 35 that with the provision of a single error calculator 87 which relies solely upon incoming data, the timing, equalization, and phase correction of the receiver 35 can be corrected to compensate for the deficiencies of the incoming signal. With the correction of these characteristics, the data detected by the detectors 83 and 85 can be introduced to a decoder 89 wherein the signals are differentially decoded, derandomized and introduced to the business machine in the associated slave stations 15, 17, and 19.

The error calculator 87 provides the system error signals EI and EQ in the respective I and Q channels. These signals can be expressed as follows:

$$EI = YI - DI\hat{I}_0$$

and $$EQ = YQ - DQ\hat{I}_0$$

where
 YI and YQ are the equalized, phase corrected signals in the respective I and Q channels.

*DI* and *DQ* are the partial response detected signals; and $\hat{l}_o$ is an updated estimate of the first sample value of the impulse response of an ideal (1, 1) partial response signal which is commonly referred to as $l_o$.

It will be noted that the system error signals EI and EQ have magnitudes which are dependent upon the degree to which the equalized and phase corrected signals YI and YQ differ from the ideal values of these signals DI$\hat{l}_o$ and DQ$\hat{l}_o$ respectively. It will also be noted that the YI and YQ signals and the DI and DQ signals are random multilevel data signals as previously discussed.

An equalization control network 91 is responsive to the error signals EI and EQ and the detected signals DI and DQ to provide equalization error signals which control the taps of the equalization network 79. This equalization network 91 is discussed generally in the patent application Ser. No. 324,657 and more specifically in a copending application of the present inventors, Ser. No. 405,290 entitled EQUALIZER and assigned of record to the assignee of record of the present application.

These equalization error signals are introduced to a decision threshold control 93 which generates the quantity $\hat{l}_o$. This quantity $\hat{l}_o$ is used to establish thresholds for the detectors 83 and 85 and is also used to calculate the system error terms EI and EQ as previously discussed.

A timing control network 94 can be made responsive to the EI and EQ signals from the error calculator 87 to control the timing of the sampler 67. The timing control network 94 is discussed generally in the patent application Ser. No. 324,657 and more specifically in a copending application of the present inventors Ser. No. 405,574, entitled DIGITAL MODEM WITH AUTOMATIC TIMING AND CONTROL assigned of record to the assignee of record of the present application.

The timing control network 94 can also be of the type responsive to a particular signal in the equalization network 79 as disclosed in a copending application of the present inventors Ser. No. 505,052 entitled TIMING RECOVERY FOR AUTOMATICALLY EQUALIZED DATA MODEM assigned of record to the assignee of record of the present application.

The signals YI' and YQ' which appear between the equalization network 79 and the phase correction network 81 in the respective I and Q channels have an undesirable phase angle $\phi$ which results from a difference in the carrier phase angles of the transmitter 27 and receiver 35. In order to correct this phase angle $\phi$, the phase correction network 81 introduces the signal YI' to a pair of multipliers 95 and 97 and introduces the signal YQ' to a pair of multipliers 99 and 101. In the multipliers 95 and 101, the respective YI' and YQ' signals are multiplied by a quantity cosine $\phi'$. Similarly in the multipliers 97 and 99, the respective signals YI' and YQ' are multiplied by a quantity $-$ sine $\phi'$. The products of the multipliers 95 and 99 are combined in an adder 103 to produce the YI signal, and the products from the multipliers 97 and 101 are combined in a differential adder 105 to produce the YQ signal.

The quantities cosine $\phi'$ and $-$ sine $\phi'$ are provided by a sine/cosine ROM 107. The angle $\phi'$ is an updated estimate of the undesirable phase angle $\phi$ and is generated by a filter 109 in response to an error term $E_{PLL}$ provided by the error calculator 87. For small differences between $\phi$ and $\phi'$, the error term $E_{PLL}$ is equal to $\phi-\phi'$ or $\Delta\phi$. A loop provided by the phase correction network 81, the detectors 83, 85, the error calculator 87, and the filter 109, is commonly referred to as the phase lock loop.

The present invention is concerned primarily with restart control apparatus for automatically synchronizing the characteristics of the receiver 35 with the characteristics of the incoming signal. The restart control apparatus includes a generator 117 which is responsive to the magnitude of at least one of the system error signals EI and EQ from the error calculator 87 to provide a synchronization quality signal W. This signal W together with threshold signals $l_o/2$ and $l_o/4$ from the decision threshold control 94 provide inputs to a master restart control 119. The master restart control 119 is clocked by pulses from a timer or clock 121. A pair of indicators such as the lights 129 and 131 can be alternatively activated by the master control 119 to signal normal and restart operation of the receiver 35. For example, the light 129 can be activated to indicate normal operation of the receiver 35 and the light 131 can be activated to indicate operation in accordance with the restart procedure disclosed herein.

In response to a synchronization quality signal W of a particular magnitude, the master restart control 119 provides a signal on a conductor 123 which is introduced to the decision threshold control 93 to control the magnitude of the quantity $l_o$. Similarly a control signal on a conductor 125 can be introduced to the equalization control network 91 to control the multiplying coefficients of the taps in the equalization network 79. The master restart control 119 may also provide a control signal on a conductor 127 which is introduced to the timing control network 94 to control the timing of the sampler 67.

The system error signal EI is indicative of the synchronization of the receiver 35 with respect to a particular symbol in the YI signal. Thus the EI signal is indicative of synchronization at a particular instant in time. Since the instantaneous synchronization may vary somewhat, it is desirable to average these system error signals EI over a particular interval of time to provide the synchronization quality signal W. Thus the generator 117 provides a means for gradually tracking the synchronization on the receiver 35.

In a particular embodiment the generator 117 can be made responsive to the random multilevel data signals in either or both of the system error signals EI and EQ. For example, in the embodiment discussed herein, the generator 117 is responsive to the system error signal EI.

Mathematically the synchronization quality signal W can be calculated by the formula:

$$W_i = [(|EI_i| - W_{i-1})]/N + W_{i-1}$$

where:
 $W_i$ is the current value of $W$;
 $W_{i-1}$ is the immediately preceding value of W;
 $EI_i$ is the current value of EI; and
 $N$ is a constant, such as 32, which determines length in bauds of the particular interval of time.

Figure 4:
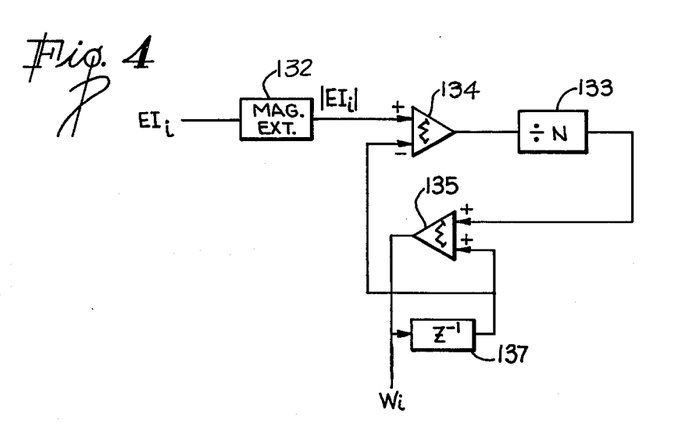
FIG. 4 is a block diagram of one embodiment of the synchronization quality signal generator of the present invention.

In order to provide this synchronization quality signal W, the generator 117 can be implemented by the apparatus illustrated in FIG. 4. The signal $EI_i$ from the error calculator 87 can be introduced to a magnitude extractor 132 to provide the absolute value of the signal $EI_i$. This quantity $|EI_i|$ can be introduced to the positive terminal of an adder 134. The quality signal in the preceding baud interval ($W_{i-1}$) can be introduced to the negative terminal of the adder 134. The output of the adder 134 can be connected to a divide network 133 which divides the quantity ($|EI_i| - W_{i-1}$) by the divisor N. This quotient from the divide network 133 can be introduced to an input terminal of an adder 135. The output of the adder 135 can be coupled through a one baud delay 137 to provide a second input to the adder 135. Thus the output of the adder provides the present synchronization quality signal $W_i$ which is equal to $$[(|EI_i| - W_{i-1})/N] + W_{i-1}$$

With respect to the generator 117, it will be noted that the synchronization quality signal W can be any signal responsive to a random multilevel data signal to provide an indication of receiver synchronization preferably over an extended period of time. In the particular apparatus illustrated in FIG. 4 the constant N can be any number. The larger values of N correspond to a relatively long particular interval of time while the smaller values of N correspond to a relatively short particular interval of time.

Figure 5:
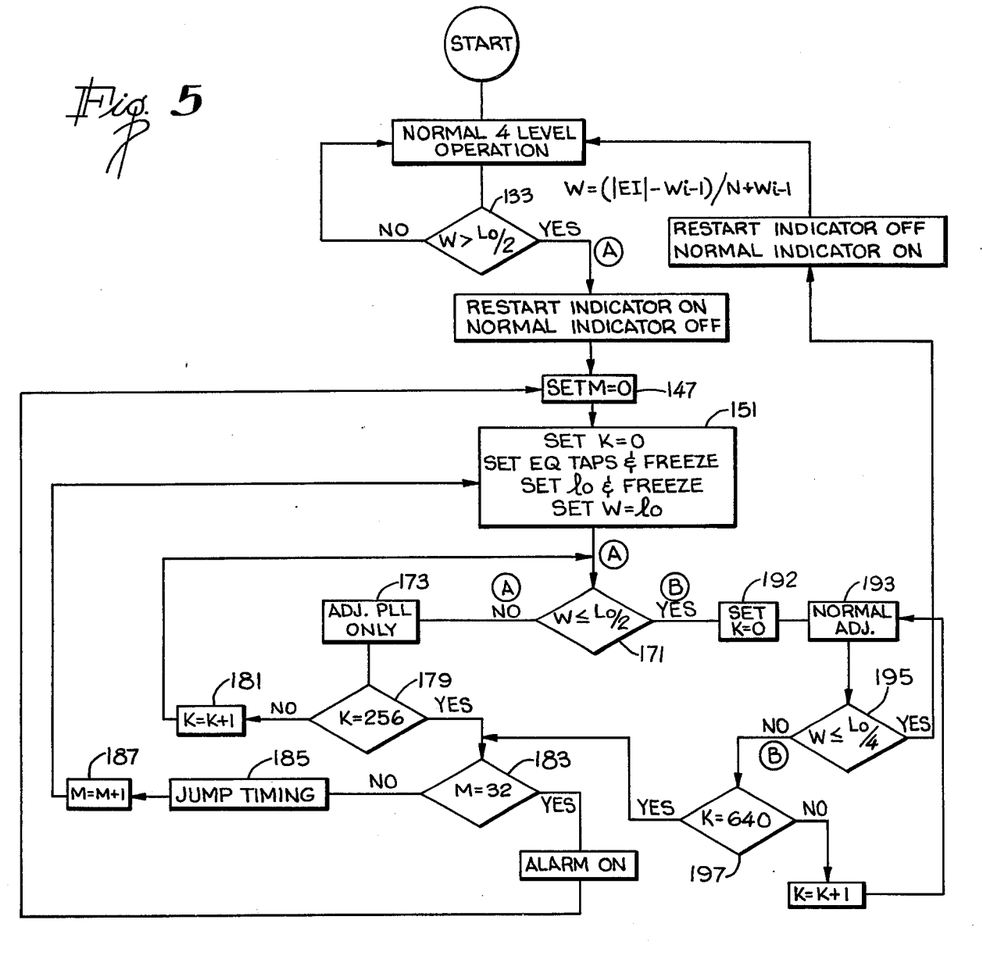
FIG. 5 is a flow chart illustrating the timing of various control functions in a preferred embodiment of the invention.

Operation of the apparatus for automatically synchronizing the receiver 25 to the incoming telephone line using random multilevel data can proceed in accordance with the flow chart illustrated in FIG. 5. The flow chart of FIG. 5 shows a preferred sequence of steps in one method of the present invention which can be embodied by the apparatus illustrated in FIG. 6. In the following discussion, FIGS. 5 and 6 will be referred to simultaneously.

During normal four-level operation of the receiver 35, the synchronization quality signal W is continuously generated by the generator 117. When the magnitude of the quality signal W becomes particularly great, thereby indicating poor synchronization, the restart sequence can begin. Although the degree of synchronization which must be maintained may vary, in a preferred embodiment of the invention a magnitude of the quality signal W greater than $l_o/2$ is considered to be intolerable. Thus the first step in the restart sequence of such an embodiment is to compare the magnitude of the signal W against a first predetermined magnitude such as $l_o/2$. In FIG. 5 this step is illustrated by a diamond-shaped box 133.

Figure 6:
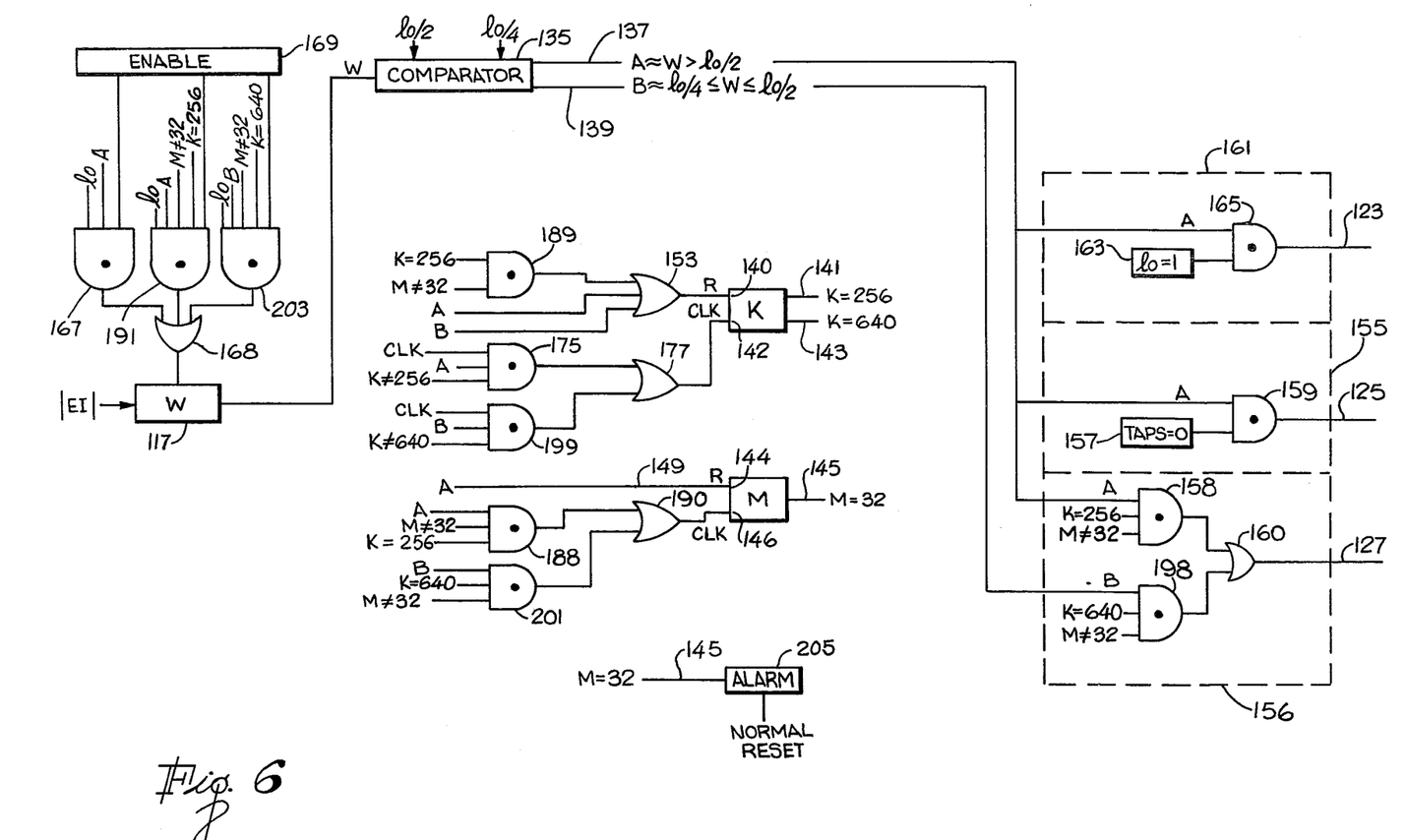
FIG. 6 is a block diagram of one embodiment of the master restart control illustrated in FIG. 3.

As shown in FIG. 6 the function associated with the box 133 can be implemented by introducing the W signal from the generator 117 to a comparator 136 along with threshold levels $l_o/2$ and $l_o/4$ which can be provided by the decision threshold control 93. At the output of the comparator 136, a signal A can be provided on a conductor 137 when the magnitude of the quality signal W is greater than the first predetermined magnitude. On a conductor 139, a signal B can be provided when the magnitude of the quality signal is greater than or equal to a second predetermined level, such as $l_o/4$, and less than or equal to the first predetermined level, such as $l_o/2$. These signals A and B can be used to enable various steps in the restart sequence.

The first and second predetermined magnitudes to which the quality signal W is compared can be any magnitude, but in general the second predetermined level will have a magnitude less than the first predetermined level. In a preferred embodiment, the first predetermined level is equal to $l_o/2$ and the second predetermined level is equal to $l_o/4$. These quantities are used in the preferred embodiment merely because they are readily available in the decision threshold control 93. Since $l_o$ does not vary greatly during operation of the receiver 35, these threshold levels are, for most practical purposes, constant values.

If the magnitude of the quality signal W is greater than the first predetermined magnitude, such as $l_o/2$, the restart sequence can begin by activating the restart indicator 131 and deactivating the normal indicator 129.

Various steps in the restart sequence can be timed by signals from a counter K and a counter M illustrated in FIG. 6. The counters K and M are activated primarily by the signals A and B. The counter K provides a signal on an output conductor 141 when the count of the counter K reaches "256". A signal is provided on the conductor 143 when the count of the counter K is equal to 640. These signals can be inverted to provide the signals "K $\neq$ 256" and "K $\neq$ 640" respectively. At the output of the counter M, a signal is provided on a conductor 145 when the count of the counter M is equal to 32. The signal can also be inverted to provide the signal M $\neq$ 32. These numbers 256, 640, and 32 are indicative of periods of time and will vary with different embodiments of the invention. The counter K can be of the conventional type including a reset terminal 140 and a clock terminal 142. Similarly the counter M includes a reset terminal 144 and a clock terminal 146.

It is of particular advantage that the parameters of the receiver 35 are updated in sequence rather than simultaneously during the restart procedure. Since the receiver 35 is decision-directed, incorrect decisions of incoming data will detune rather than improve the receiver. With unknown four-level incoming data, if the sampling time is approximately correct, the phase lock loop will converge if it is adjusted alone. After the phase lock loop has converged, the probability of wrong decisions with respect to the incoming data is significantly reduced.

In the preferred embodiment, updating of the equalization network 79, the decision threshold control 93, and the sampler 67 is undertaken only after the phase lock loop has converged. Following this sequence, the entire receiver 35 is eventually synchronized and returned to normal operation.

After the restart indicator 131 has been activated, the count of the counter M can be set to zero as shown by the box 147 in FIG. 5. This can be accomplished by introducing the signal A on a conductor 149 to the reset terminal 144 of the counter M. After the counter M has been zeroed, the counter K can also be zeroed as shown by the box 151 in FIG. 5. This can be accomplished by introducting the signal A through an OR gate 153 to the reset terminal 140 of the counter K.

While the counter K is being zeroed, the taps of the equalization network 79 can be set to zero and frozen, the quantity $l_o$ can be reset and frozen, and the quantity W can be set equal to $l_o$. The taps in the equalization network 79 can be set to zero by an equalization restart control 155 illustrated to the right in FIG. 6. This equalization restart control 155 includes a generator 157 which provides a signal equivalent to "taps = zero." This signal can be enabled through an AND gate 159 by the signal A and introduced to the equalization control network 91 on the conductor 125. As long as the signal A exists, the taps of the equalization network 79 will be frozen to a zero magnitude by the restart control 155.

The quantity $l_o$ can be reset and frozen by a restart control 161 for the decision threshold control 93. The restart control 161 includes a generator 163 which provides a signal equivalent to $l_o = 1$. This signal can be enabled through an AND gate 165 by the signal A and introduced to the decision threshold control 93 on the conductor 123. As long as the signal A exists, the quantity $l_o$ will be frozen to a magnitude of one by the instant control 161.

The magnitude of the quality signal W can be set to $l_o$ using an AND gate 167 shown to the left in FIG. 6. This AND gate 167 receives the quantity $l_o$ from the decision threshold control 93, the signal A from the comparator 135, and an ENABLE signal from an EN-ABLE signal generator 169. When these signals appear simultaneously at the input to the AND gate 167, the signals $l_o$ passes through an OR gate 168 to set the synchronization quality signal W equal to $l_o$. The generator 169 provides the ENABLE signal with a duration equivalent in time to the duration of the quantity $l_o$. This insures that the quantity $l_o$ is introduced to the generator 117 only as long as the ENABLE signal is active. Thus the quality signal W is set to $l_o$ initially but is free to vary after the ENABLE signal is terminated. By setting the quality signal W equal to $l_o$, a high degree of synchronization error is introduced into the receiver 35 so that correction of various parameters in the receiver 35 can proceed for a significant period of time.

Having implemented the functions associated with the box 151 in FIG. 5, the next step in the restart sequence can be to determine if the quality signal W is less than or equal to the first predetermined magnitude, such as $l_o/2$. This decision is made in a diamond-shaped box designated by the reference numeral 171 in FIG. 5. Since the quality signal W is set equal to $l_o$ in the box 151, the decision in the box 171 will, at least initially, be negative so that the restart sequence will proceed to the left in FIG. 5.

With the taps of the equalization network 79 frozen and the quantity $l_o$ also frozen, the adjustment of the phase lock loop can proceed as shown by the box 173. This can proceed for the duration of a first trial period which, in a preferred embodiment, is equal to 256 counts by the counter K. As noted, this number of counts is arbitrary and will vary in different embodiments of the invention. The signal A is introduced to an AND gate 175 along with the signal K $\neq$ 256 and clock pulses from the clock 121. The output of the AND gate 175 is introduced through an OR gate 177 to the clock terminal 142 of the counter K. When the count of the counter K reaches 256, the signal K $\neq$ 256 ceases as does the clocking of the counter K. The decision as to whether the counter K is equal to 256 is illustrated in a box 179 in FIG. 5. If this decision is negative, an additional count is added to the counter K as shown by the box 181. As long as the count of the counter K is not equal to 256, the restart sequence will proceed in the loop including the boxes 171, 173, 179, and 181.

If the adjustment of the phase lock loop, as shown by the box 173, does not reduce the quality signal W to a level less than $l_o/2$, as determined in the decision box 171, it may be advisable to jump the timing of the sampler 67 before proceeding with further adjustment of the phase lock loop. Thus the timing can be jumped and another trial period undertaken. These steps can iterate until a predetermined number of trial periods such as 32 are completed.

The count of the counter K determines the duration of each trial period while the count of the counter M determines the number of trial periods which have been undertaken. In the preferred embodiment, this number of trial periods is equal to 32 and the decision as to whether the count of the counter M is greater than or less than 32 is made in the box designated by the reference numeral 183.

If the count of the counter K is equal to 256 and the count of the counter M is not equal to 32, the restart sequence can proceed to the left of the box 183 in FIG. 5. Thus the timing of the sampler 67 can be jumped an increment of time, such as 1/16 baud as shown by the box 185.

The timing jumps associated with the box 185 in FIG. 5 can be made by the restart timing control 156 illustrated to the right in FIG. 6. Thus the signal A and the signals K = 256 and M $\neq$ 32 can be introduced to an AND gate 158. The output of the AND gate 158 can be introduced through an OR gate 160 to provide a restart timing signal on the conductor 127. In response to the restart timing signal on the conductor 127, the timing control network 94 (FIG. 3) jumps the timing of the sampler 67 in increments such as 1/16 baud.

With each timing jump, an additional count can be added to the counter M as shown by the box 187. In FIG. 6, the signals A, M $\neq$ 32 and K = 256 can be introduced to an AND gate 188. The signal at the output of the gate 188 can be introduced through an OR gate 190 to the clock terminal 146 of the counter M. In this manner, an additional count can be added to the counter M.

After updating the counter M, the restart sequence can proceed to box 151. At this point, the count of the counter K can be reset to zero by introducing the signals K = 256 and M $\neq$ 32 to an AND gate 189. The output of the AND gate 189 can be introduced through the OR gate 153 to the reset terminal 140 of the counter K. Since the signal A will continue to be active under these conditions, the taps of the equalization network 79 will continue to be frozen by the equalizaion restart control 155 and the quantity $l_o$ will also be frozen by the control 161.

The synchronization quality signal W can be returned to a magnitude of $l_o$ by an AND gate 191 connected to receive the signals $l_o$, A, M $\neq$ 32, K = 256, and the ENABLE signal from the generator 169. The output of the AND gate 191 can be introduced to the generator 117 through the OR gate 168 to set the quality signal W equal to $l_o$. Following these adjustments a new trial period can begin. As long as the quality signal W has a magnitude greater than or equal to the first threshold level such as $l_o/2$, the restart sequence will proceed through the loops including the boxes 171, 173, 179, 181, 183, 185, and 187.

Eventually the adjusting of the phase lock loop by the box 173 and the jumping of the timing by the box 185 will reduce the level of the quality signal W to a magnitude less than the first predetermined level, such as $l_o/2$. At this point the signal A will discontinue and the signal B will become active at the output of the comparator 135 (FIG. 6). Further steps in the restart sequence will proceed to the right of the box 171 in FIG. 5.

Initially the counter K can be reset equal to zero as shown by a box 192. This can be implemented by introducing the signal B directly through the OR gate 153 to the reset terminal 140 of the counter K. After the counter K has been reset, normal adjustment of the receiver 35 can be undertaken as shown by the box 193. Since the signal A is no longer active during this portion of the sequence, the signal $l_o = 1$ will no longer be enabled through the gate 165 so that the quantity $l_o$ in the decision threshold control 93 will no longer be frozen. Similarly the signal taps = 0 will no longer be enabled through the AND gate 159 so that the taps of the equalization network 79 are no longer frozen. The normal adjustment of the receiver 35 can continue either for a second predetermined interval of time or until the magnitude of the quality signal W is reduced below the second predetermined magnitude, such as $l_o/4$. This decision as to whether the magnitude of the quality signal W is less than or equal to the second predetermined level is made in the box designated by the reference numeral 195 in FIG. 5. If this decision is negative, the restart sequence proceeds to the left in FIG. 5.

It may be desirable that the trial period associated with the normal adjustment of the receiver 35, as shown by the box 193 be greater than the trial period associated with the phase lock loop adjustment of the receiver 35, as shown by the box 173. Thus the normal adjustment may continue until the counter K achieves a count of 640. As noted, this number is arbitrary and will vary with different embodiments of the invention. The decision as to whether the count of the counter K is equal to 640 is made in the box designated by the reference numeral 197.

The clocking of the counter K when the signal B is active can be implemented by an AND gate 199 which receives the signals K ≠ 640, B, and clock pulses from the timer 121. The output of the AND gate 199 can be introduced through the OR gate 177 to the clock terminal 142 of the counter K.

If the magnitude of the quality signal W is not less than the second predetermined level when the count of the counter K is equal to 640, and also if the number of trial periods is not equal to 32, it may be desirable to jump the timing of the sampler 67. Thus the restart sequence can proceed through the boxes 197, 183, 185, and 187 in the manner previously described. When the signal B is active, the timing can be jumped by the restart timing control 156 of FIG. 6. Thus the signal B, K = 640 and M ≠ 32 can be introduced to an AND gate 198; the signal at the output of the AND gate 198 can be introduced through the OR gate 160 and onto the conductor 127 to jump the timing.

Also, when the signal B is active, the updating of the counter M can be accomplished with an AND gate 201 receiving input signals M ≠ 32, K = 640 and B. The output of the AND gate 201 can be introduced through the OR gate 190 to the clock terminal 146 of the counter M.

When timing jumps (box 185) follow the normal adjustment of the receiver 35 (box 193), the restart sequence preferably iterates to the box 151. The taps of the equalization network 79 and the quantity $l_o$ can be frozen in the manner previously discussed. Also the quality signal W can be set equal to $l_o$ as shown by an AND gate 203 in FIG. 6. In addition to the ENABLE signal from the generator 169, the AND gate 203 can be connected to receive the signals $l_o$, B, M ≠ 32, and K = 640. The output of the AND gate 203 is introduced through the OR gate 168 to the generator 117 to set the signal W equal to $l_o$.

If a particular number of trials, such as 32, have been completed and the magnitude of the quality signal W has not been reduced below the second predetermined level, such as $l_o/4$, it may be desirable to discontinue the restart sequence and to activate an alarm as shown by the box 205 in FIG. 5. This step of the restart sequence can be implemented as shown in FIG. 6, by the alarm 205 which can be activated by the signal M = 32 on the conductor 145.

If the magnitude of the quality signal W is less than or equal to the second predetermined magnitude, such as $l_o/4$, within a particular number of trials, the restart sequence can proceed to the right of the box 195 in FIG. 5. Thus the restart indicator 131 can be inhibited while the normal indicator 129 is activated. Finally the receiver 35 can be returned to normal four-level operation.

In the manner discussed, the method and apparatus of the present invention provides for the restarting or resynchronization of the receiver 35 in response to a random multilevel data signal. The transmission of normal data need not be inhibited in favor of a special restarting sequence of bilevel data. This is particularly desirable in a multipoint communication network 11 wherein many slave stations, such as the stations 15, 17, and 19 simultaneously receive the normal data transmission. If a particular one of the receivers 35 falls out of synchronization, the normal data transmission can continue.

In response to the random multilevel data signal, the phase lock loop of the receiver can be adjusted alone while the other parameters are frozen. After the phase lock loop has converged, the probability of wrong decisions of the incoming signal is reduced, and the equalization network 79, the decision threshold control 93, and the timing control network 94 can be returned to normal operation.

Although the invention has been described with reference to particular steps and a particular sequence of the steps in the preferred method, other steps and other sequence will now be apparent to those of ordinary skill in the art to accomplish the same function.

The particular implementation of the invention can also vary significantly within the scope of the invention. For example the length of each trial period and the total number of trial periods may vary with a particular design. Similarly the total number of system error signals EI contributing to the average of the synchronization quality signal W may also vary. It should also be noted that the synchronization quality signal W can be derived from the error signal EQ individually or in combination with the error signal EI. Therefore, although the invention has been described with reference to particular embodiments, the scope of the invention should be ascertained only with reference to the following claims.

We claim:

1. A receiver for receiving an analog data signal comprising:
   sampling means for sampling the analog data signal to provide a random multilevel data signal;
   equalization means for correcting at least some of the delay and attenuation distortion of the random multilevel signal to provide a substantially equalized data signal;
   phase correction means for at least partially correcting the phase of the equalized data signal to provide a substantially phase corrected signal;

detection means responsive to the phase corrected signal for detecting the data in the phase corrected signal to provide a detected data signal;

error calculation means responsive to at least one of the phase corrected signal and the detected data signal for generating a system error signal, the system error signal having a magnitude dependent upon the degree of adaptation of the characteristics of the receiver to the characteristics of the analog data signal;

means responsive to the magnitude of the system error signal to provide a quality signal having a magnitude dependent upon the degree of adaptation of the characteristics of the receiver to the characteristics of the analog data signal;

first means responsive to the magnitude of the quality signal being at least of a first value for holding said sampling means and said equalization means against adjustment and adjusting the phase correction means to tend to reduce the magnitude of the system error signal; and said first means including means responsive to the magnitude of the quality signal being at least of said first value after a first period for adjusting the sampling means and means for thereafter holding said sampling means and said equalization means against adjustment and adjusting the phase correction means to tend to reduce the magnitude of the system error signal.

2. A receiver adapted to receive an input analog signal representative of data, comprising:

sampling means for sampling the input signal to provide a digital signal;

equalization means for adapting the equalization characteristics of the receiver to the equalization characteristics of the input signal;

phase correction means for adapting the phase characteristics of the receiver to the phase characteristics of the input signal;

detection means for detecting the data in the digital data signal;

means for coupling the sampling means, equalization means, phase correction means, and the detection means to each other;

error calculation means responsive to the digital signal for generating a system error signal;

signal generation means responsive to the system error signal to provide a quality signal having a value dependent upon the degree of adaptation of the characteristics of the receiver to the characteristics of the input signal;

control means responsive to the quality signal being within a first range of values for holding one of the equalization means and the phase correction means against adjustment and adjusting the other of the equalization means and the phase correction means to tend to adapt the characteristics of the receiver to the characteristics of the input signal; and said control means including means responsive to the quality signal being within said first range after a first period for adjusting the sampling means and means for thereafter holding said one means against adjustment and adjusting said other means to tend to adapt the characteristics of the receiver to the characteristics of the input signal.

3. A receiver as defined in claim 2 wherein said one means is the equalization means.

4. A receiver as defined in claim 2 wherein said control means includes means responsive to the quality signal being within a second range of values for allowing adjustment of said one means.

5. A receiver for receiving an analog input signal comprising:

adjustable means for adapting a plurality of characteristics of the receiver to the characteristics of the input signal, said receiver characteristics including phase, equalization, and timing characteristics;

error calculator means for providing a system error signal which is related to the degree to which the characteristics of the receiver are adapted to the characteristics of the input signal;

signal generation means responsive to the system error signal for providing a quality signal which is related to the value of the system error signal over an interval of time;

first means responsive to the quality signal being within a first range of values for holding the equalization and timing characteristics of the receiver against adjustment and adjusting the phase characteristic of the receiver; and said first means including means responsive to the quality signal being within said first range of values after a first period for adjusting the timing characteristics of the receiver and then holding said equalization and timing characteristics against adjustment and adjusting the phase characteristic.

6. A receiver as defined in claim 5 wherein said first means includes means responsive to the quality signal being within a second range of values for allowing adjustment of said equalization characteristic, said second range of values indicating better adaptation of the receiver to the input signal than said first range of values.

7. A receiver for receiving an analog input signal comprising:

adjustable means for adapting a plurality of characteristics of the receiver to the characteristics of the input signal;

error calculator means for providing a system error signal which is related to the degree to which the characteristics of the receiver are adapted to the characteristics of the input signal;

first means responsive to said system error signal to adjust said adjustable means in accordance with either of a normal adjustment mode or a special adjustment mode, both of said adjustment modes tending to better adapt the characteristics of the receiver to the characteristics of the input signal;

signal generation means responsive to the system error signal for providing a quality signal which is related to the value of the system error signal over an interval of time;

said first means including means responsive to the quality signal being within a first range of values for inhibiting said normal adjustment mode and for adjusting said adjustable means in accordance with said special adjustment mode;

said first means including means responsive to the quality signal being within a second range of values for enabling the normal adjustment mode and inhibiting the special adjustment mode, said second range of values being indicative of better adaptation of the characteristics of the receiver to the characteristics of the input signal than said first range of values;

at least first and second of said characteristics of the receiver being adjustable in said normal adjustment mode; and said first characteristic being held against adjustment and second characteristic being adjustable in said special adjustment mode.

8. A receiver as defined in claim 7 wherein said first characteristic is an equalization characteristic and the second characteristic is a phase characteristic.

9. A receiver as defined in claim 7 wherein said adjustable means includes sampling means having a timing characteristic for sampling the input analog signal to provide a digital signal, and said first means periodically changes the timing characteristic during the said special adjustment sequence.

10. A receiver as defined in claim 9 wherein said first characteristic is an equalization characteristic and the second characteristic is a phase characteristic.

11. A method of adapting a receiver to the characteristics of an analog input signal, said method comprising:
sampling the analog data signal to provide a digital data signal;
substantially equalizing the digital signal using an equalizer having a plurality of taps;
substantially phase correcting the digital signal;
generating a system error signal which is related to the degree to which the characteristics of the receiver are adapted to the characteristics of the input signal;
generating a quality signal which is related to the value of the system error signal over an interval of time;
comparing the magnitude of the quality signal to a first reference level;
continuing said step of phase correcting and setting said equalizer taps to a fixed value when the magnitude of the quality signal exceeds the magnitude of the first reference level;
adjusting the sampling of the analog signal if the magnitude of the quality signal exceeds the magnitude of the first reference level after a first period; and
continuing said step of phase correcting while maintaining said equalizer taps at said fixed value subsequent to said step of adjusting the sampling.

12. A method as defined in claim 11 including allowing the equalizer taps to be set to other values after the quality signal drops below said first reference level.

* * * * *